United States Patent [19]
Valentine et al.

[11] Patent Number: 4,625,999
[45] Date of Patent: Dec. 2, 1986

[54] REMOTELY-OPERABLE BALL JOINT CONNECTOR

[75] Inventors: Gordon A. Valentine, Denver, Colo.; Edwin J. Gale, Aurora, Calif.

[73] Assignee: Stanley Aviation Corporation, Aurora, Colo.

[21] Appl. No.: 322,926

[22] Filed: Nov. 19, 1981

[51] Int. Cl.⁴ .............................................. F16L 35/00
[52] U.S. Cl. ...................................... 285/24; 285/32; 285/263; 285/269; 285/325; 285/340
[58] Field of Search ......................... 285/24, 27, 31, 32, 285/325, 326, 327, 261, 263, 268, 269, 340, 179, 180, 18

[56] References Cited
U.S. PATENT DOCUMENTS

| | | |
|---|---|---|
| 1,281,293 | 10/1918 | Clark .................................. 285/24 X |
| 1,507,840 | 9/1924 | Landgraf ........................ 285/340 X |
| 2,692,102 | 10/1954 | Cobham et al. . |
| 3,319,979 | 5/1967 | Herold et al. ........................... 285/24 |
| 3,625,552 | 12/1971 | Mahoff ................................ 285/336 |
| 3,774,636 | 11/1973 | Arita . |
| 4,045,054 | 8/1977 | Arnold . |
| 4,133,558 | 1/1979 | Ahlstone . |
| 4,153,278 | 5/1979 | Ahlstone . |
| 4,153,281 | 5/1979 | Ahlstone . |
| 4,180,285 | 12/1979 | Reneau ................................. 285/261 |
| 4,188,050 | 2/1980 | Lochte ................................... 285/24 |
| 4,371,198 | 1/1983 | Martin .............................. 285/263 X |

Primary Examiner—Dave W. Arola
Attorney, Agent, or Firm—Nies, Webner, Kurz & Bergert

[57] ABSTRACT

A remotely-operable connector comprising a pair of female end fittings, each adapted to be permanently fixed one to each of a pair of pipes to be coupled together, and a jumper assembly having a jumper pipe terminating at opposite ends in male end fittings which are received one in each of the female end fittings. Each mating pair of male and female fittings is received in a pivot housing which is mounted for universal articulation on the female fitting for enabling the housing to be angularly aligned with the end of the male fitting which is received in the female fitting.

14 Claims, 15 Drawing Figures

REMOTELY-OPERABLE BALL JOINT CONNECTOR

FIELD OF INVENTION

This invention relates to fluid-conveying pipe connectors and is particularly concerned with a novel ball joint connector assembly of the remotely-operable type.

BACKGROUND

Prior to this invention, remotely-operable connectors have been widely used in the nuclear industry to join pipe sections in plants for handling radioactive materials and other fluids. One such remotely-operable connector is shown in FIG. 1 of the drawings.

Figure 1:
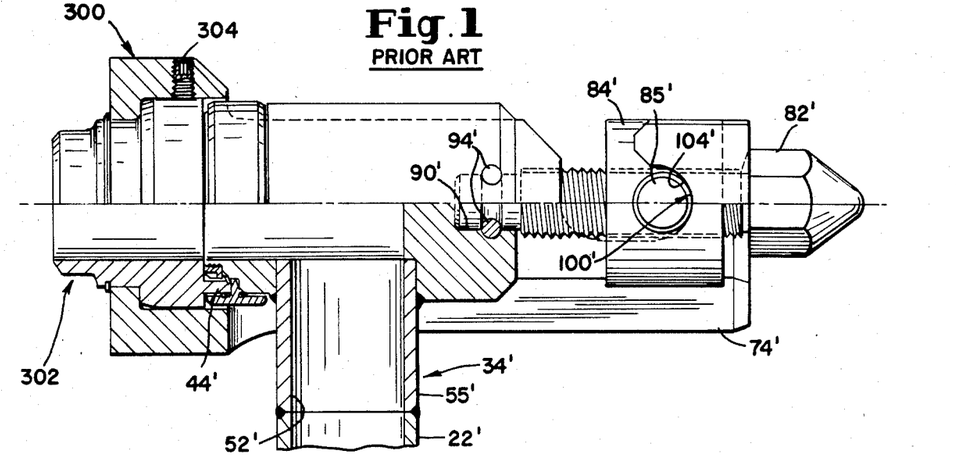
FIG. 1 is a partially sectioned side elevation of a prior art, remotely-operable connector.

The connector of FIG. 1 comprises a pair of female end fittings and a jumper pipe assembly. The female end fittings are welded one to each of the stationary pipe sections to be interconnected. The jumper pipe assembly has a jumper pipe terminating at opposite ends in male end fittings, and the male end fittings are inserted one in each of the female fittings. A connector housing receives each mating pair of the male and female fittings and is rigidly fixed to the female fitting.

A torsionally deflectable seal ring positioned on the male fitting establishes a seal between the mating male and female fittings. Remotely-operable tools are used to install the jumper assembly with other parts of the connector to protect the worker from hazardous radioactive conditions.

One of the problems with the connector of FIG. 1 is that the mating male and female fittings must be aligned accurately with each other in order to achieve a reliable fluid tight seal between the mating parts. If the mating male and female fittings are misaligned (either angularly, offset laterally, or both) in the final assembly, the jumper pipe and/or the pipe section must be deformed to obtain the alignment needed for reliably establishing the seal.

Another problem arises where male end fitting and the connector housing are initially misaligned upon positioning the male fitting in the connector housing. As the misaligned male fitting is selectively clamped or confined in the connector housing, the male fitting will be cammed into alignment with the housing, causing deformation of the jumper pipe and/or the pipeline section which is coupled to the jumper pipe by the mating male and female fittings.

The present invention overcomes the foregoing problems and offers additional advantages as will become apparent from the following summary and detailed description.

SUMMARY AND OBJECTS OF INVENTION

In contrast to the prior connector construction shown in FIG. 1, the male end fitting of the present invention is received in a pivot housing which is mounted on the mating female end fitting for universal pivotable movement or articulation. This novel construction provides a ball joint connection between the female end (which is rigidly fixed to the pipeline section) and the pivot housing to allow the pivot housing to be articulated relative to the female fitting and into alignment with the male end connector without deforming or otherwise stressing the pipeline sections, the jumper pipe or any other part of the connector assembly.

The same prior art seal ring is used in the present invention for establishing the seal between the mating male and female end fittings, but in the present invention, the seal ring-engaging surface on the female end is contained in spherical envelope to maintain a reliable fluid tight seal even where the mating male and female fittings are angularly misaligned.

In further accordance with this invention, a first set of spring-biased plungers or other suitable elements yieldably engage the pivot housing to hold it in near alignment with the connector's female fitting during initial insertion of the male fitting, while still allowing the pivot housing to articulate about the female fitting to become aligned with the mating end of the male fitting. These plungers are pre-loaded by their springs to keep the pivot housing from drooping under the influence of its own weight.

In the illustrated embodiment, a second set of spring-biased plungers or other suitable elements are positioned to yieldable engage the free end of the male fitting to provide a surface against which the pivot housing can react to articulate to an aligning position with the male fitting. The second set of spring-biased plungers keeps the seal ring out of engagement with the female fitting until the pivot housing has been articulated into alignment with the male end. This prevents leak-producing damage to the seal ring and the female fitting's seal engaging surface during installation.

With the foregoing in mind, the general aim and purpose of this invention is to improve the prior connector construction shown in FIG. 1.

More specifically, it is an object of this invention to provide a novel remotely-operable connector having a ball type joint which allows the pivot housing to align with the connector's male end fitting without deforming or stressing other parts of the connector assembly or the pipe sections to be interconnected by the connector assembly.

Another more specific object of this invention is to provide a novel remotely-operable connector in which a reliable fluid tight seal is established between the connector's mating male and female fittings even though the mating male and female fittings are misaligned in the final installation.

Further objects of this invention will appear as the description proceeds in connection with the below-described drawings and the appended claims.

DETAILED DESCRIPTION

Figure 2:
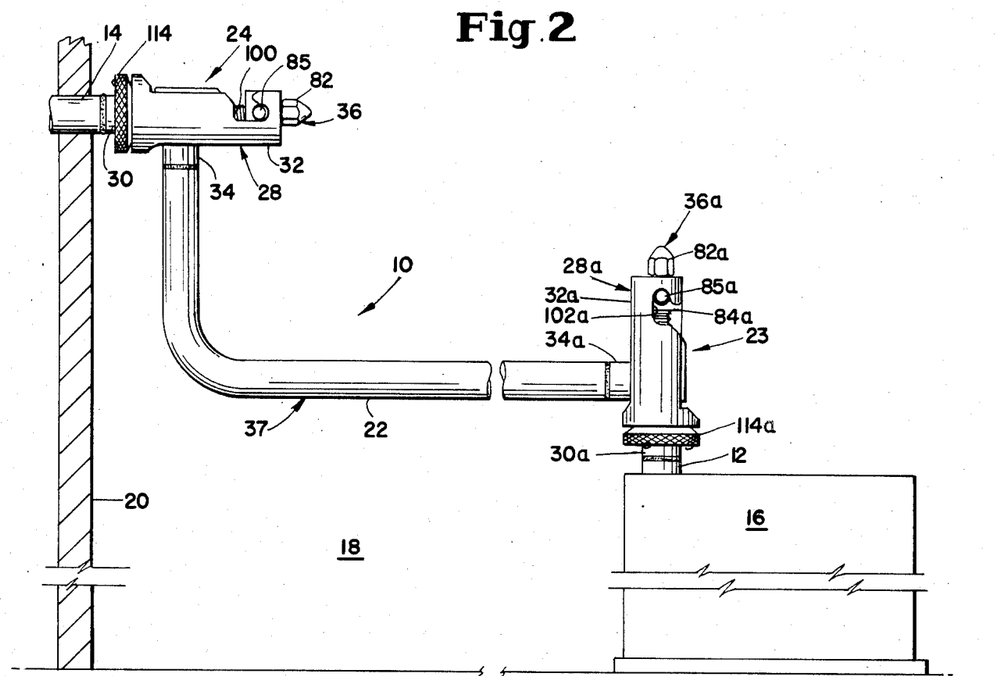
FIG. 2 is an elevation showing the installation of the connector of this invention in a plant for processing radioactive material.
Figure 2A:
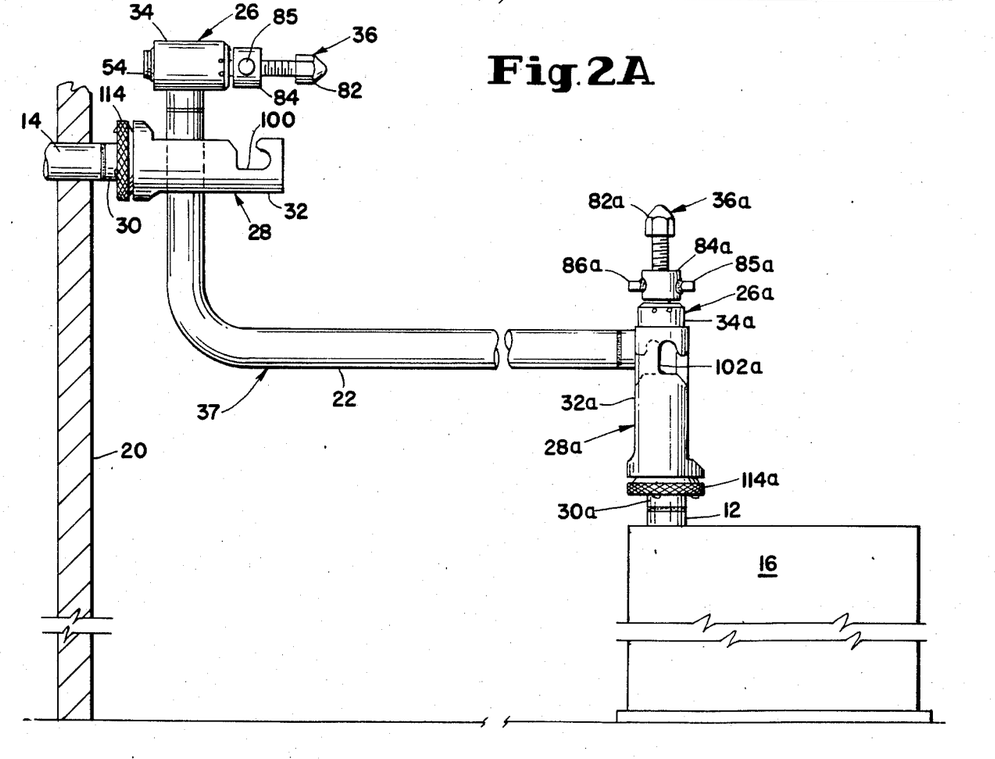
FIG. 2A is a view similar to FIG. 2, but showing an intermediate stage of the installation of the connector.

In the illustrative example shown in FIGS. 2 and 2A, the remotely-installable connector of this invention is indicated at 10 and is used to interconnect a pair of spaced apart, fluid conveying, rigid pipeline sections or pipes 12 and 14. Pipe section 12 extends vertically upwardly from a processing module 16 or other equipment in an enclosed cell 18 of a radioactive material processing plant, and pipe section 14 extends horizontally through one of the cell's walls 20. Both pipes 12 and 14 are fixed in place.

Connector 10 generally comprises a pair of male/female connector or coupler assemblies 23 and 24 and a rigid jumper pipe 22 extending between assemblies 23 and 24. Jumper pipe 22 is shown in FIG. 2 to have an L-shaped configuration to accommodate the connection between vertical and horizontal pipe sections 12, 14.

The male/female coupler assembly 24 comprises a male end unit 26 (or male end connector as it is also called) and a female end unit 28. Female unit 28 comprises a fluid-conveying female end fitting 30 and a hollow pivot housing 32. Male unit 26 comprises a fluid-conveying male end fitting 34 and a remotely-operable locking or clamping mechanism 36.

With one exception pertaining to the pivot housing, the female assembly 23 is the same as assembly 24. Accordingly, like reference numerals have been used to designate like parts, except that the reference numerals used for assembly 23 have been suffixed by the letter "a" to distinguish them from the reference numerals used for assembly 24.

Still referring to FIG. 2, female fitting 30 is welded or otherwise permanently fixed to the end of pipe section 14, and the female fitting 30a is likewise welded or otherwise permanently fixed to the end of pipe 12. Male fitting 34 is welded or otherwise suitably fixed to one end of jumper pipe 22, and male fitting 34a is likewise welded or otherwise suitably fixed to the other end of jumper pipe 22. Jumper pipe 22 therefore terminates at opposite ends in male fittings 34, 34a to form a jumper pipe sub-assembly 37. Before describing the connector assemblies 23, 24 in greater detail, the installation of connector 10 will be generally explained.

After mounting pivot housing 32 and a retainer nut 114 (to be described later) on female fitting 30, fitting 30 is welded to pipe section 14. Likewise, female fitting 30a is welded to pipe section 12 after the pivot housing 32a and the retainer nut 114a are mounted on the female fitting.

Jumper pipe 22 is pre-assembled with male end units 26, 26a by welding male fitting 34, 34a to jumper pipe 22. The pre-assembled jumper pipe assembly 37 is then transferred into cell 18 where it is coupled to female units 28, 28a by using remotely-operable tools which are manipulated by a worker from a location exteriorly of cell 18 to protect the worker from hazardous radioactive conditions inside the cell. Remotely-operable tools may also be used to mount retainer nuts 114, 114a and housings 32, 32a on female fittings 30, 30a and to weld fittings 30, 30a to pipe sections.

Figure 7:
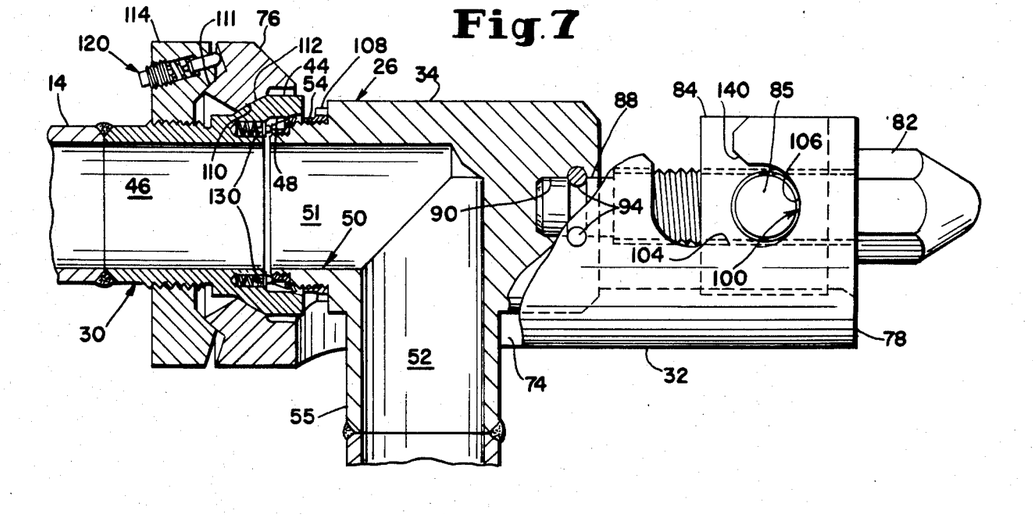
FIG. 7 a longitudinal section taken substantially along lines 7—7 of FIG. 3.
Figure 7A:
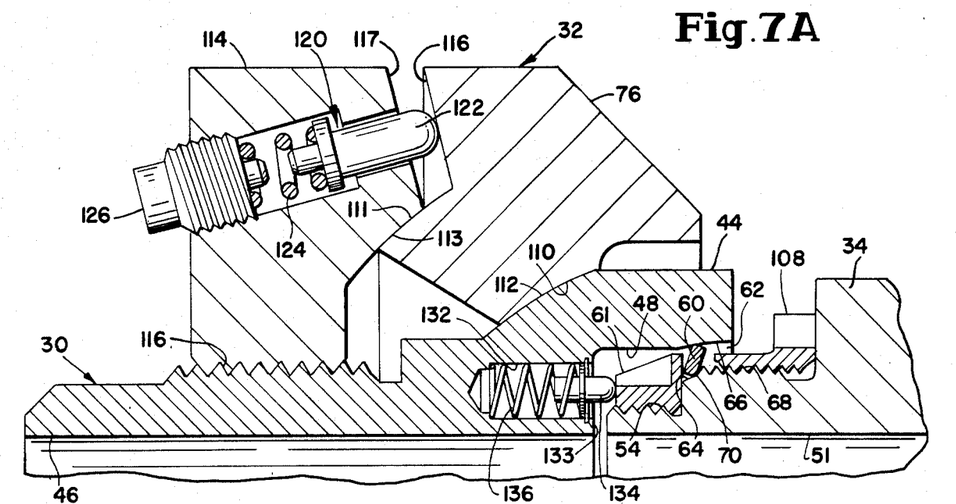
FIG. 7A is an enlarged fragmentary view of FIG. 7.

Referring now to FIGS. 3-7, and particularly to FIGS. 7 and 7A, female fitting 30 is formed with a tubular cross section and terminates at its end opposite from pipe section 14 in a diametrically enlarged bell-shaped end section 44. A straight, uniformly diametered, fluid flow passage 46 is formed through fitting 30 and opens into an enlarged bell mouth 48 which is defined by the enlarged end section 44.

The end of fitting 30 remote from the bell-shaped section 44 is butt welded to pipe section 14. Female fitting 30 axially aligns with pipe section 14 as best shown in FIG. 7.

Still referring to FIG. 7, male fitting 34 is formed with an L-shaped fluid flow passage 50 having intersecting uniformly diametered leg sections 51 and 52 which extend at right angles to each other. The male fitting's end portion which defines passage section 51 is indicated at 54 and is sized to be freely received within the bell mouth 48 of female fitting 30. The male fitting's body portion defining passage 52 is indicated at 55 and normally intersects body portion 54. Passages 46 and 50 are in fluid communication with each other.

In FIG. 7, the male fitting's passage section 51 is shown to be axially aligned with the female flow passage 46. However, depending upon installation conditions, passage section 51 may be angularly misaligned with passage 46 in the final assembly as shown, for example, in FIG. 9.

Referring back to FIG. 7, male fitting 34 is butt welded to jumper pipe 22 such that passage section 52 axially aligns with the connected end of the jumper pipe. The internal diameters of pipe section 14, passages 46 and 50 and jumper pipe 22 are preferably equal.

As shown in FIG. 7A, a torsionally deflectable seal ring 60 of rectangular cross section is mounted on the male fitting's body portion 54 for establishing a fluid tight seal between fittings 34 and 30. Seal ring 60 is preferably the same as the one disclosed in U.S. Pat. No. 3,625,552 which issued on Dec. 7, 1971 to George A. Mahoff et al. The disclosure of U.S. Pat. No. 3,625,552 is hereby incorporated into this specification by reference. A retainer ring 61 is threadedly mounted on male end portion 54 for retaining the seal ring on end portion 54 and also for guiding male end portion 54 into the female fitting to avoid damage to the seal ring.

As best shown in FIG. 7A, seal ring 60 peripherally surrounds the male end portion 54 and lies in an endless circumferentially extending cavity 62 which is defined by the axially overlapping, radially spaced apart portions of fittings 30, 34. Cavity 62 is delimited by an exterior conical surface 64 on the male end portion 54 and by an interior surface 66 of the female fitting's bell-shaped portion 44. Surfaces 64 intersect with another conical surface to define a circumferentially extending corner 70. Diagonally opposite corner edges of seal ring 60 respectively seat in corner 70 and against the female fitting's interior wall surface 66 to establish the seal between the mating male and female fittings.

As shown in FIGS. 3, 5, 6, 7 and 11, pivot housing 32 has an open ended, tubular configuration and is formed with a pair of relatively wide, diametrically opposed, longitudinally extending, coextensive slots 72 and 74. The pivot housing's tubular end portion defining the closed ends of slots 72, 74 is indicated at 76 in FIGS. 3 and 7 and peripherally surrounds the female fitting's bell-shaped portion 44. Housing 32 extends axially beyond fittings 30, 34 and terminates in an end face 78. Slots 72, 74 extend to and open at the pivot housing's end face 78.

As best shown in FIG. 7, the male end portion 54 is received in pivot housing 32, and the male fitting's body portion 55 (which defines passage 52) extends freely through and beyond the lower slot 74.

Figure 3:
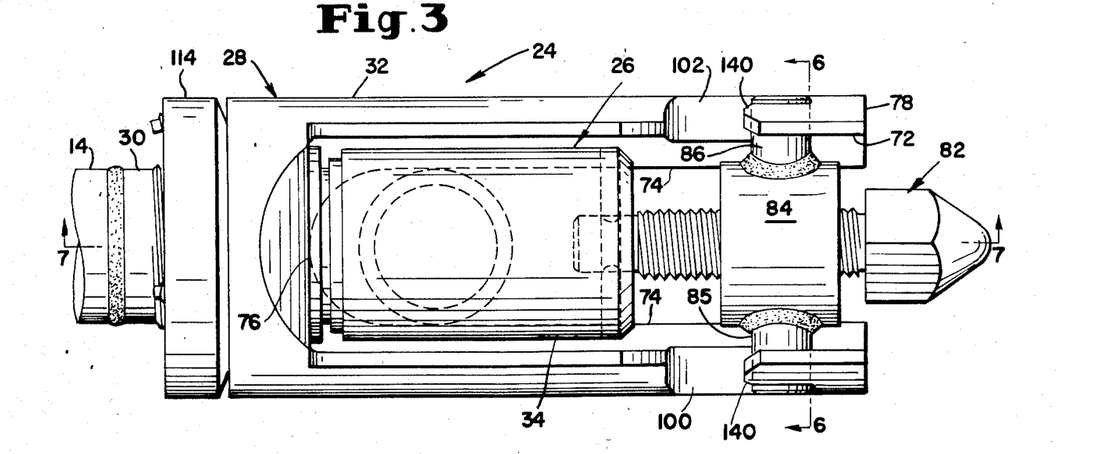
FIG. 3 is a top plan view of the horizontally extending shown in FIGS. 2 and 2A.
Figure 4:
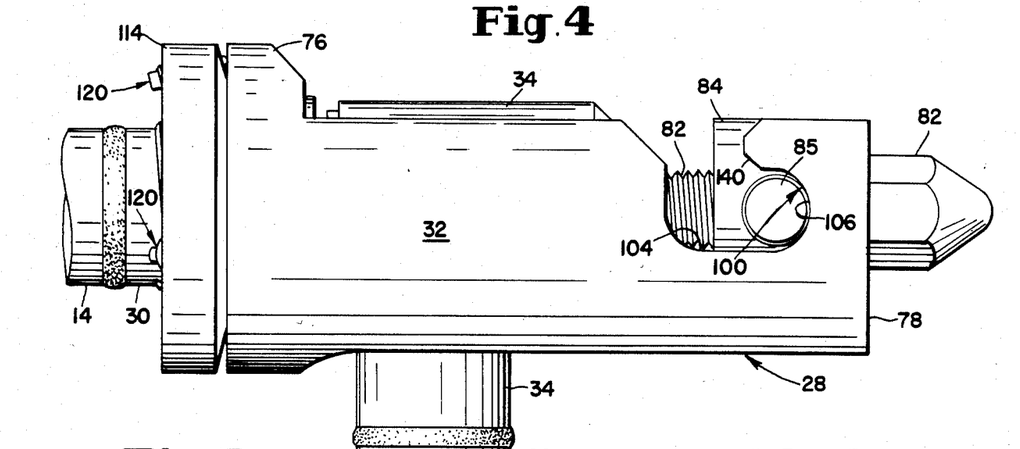
FIG. 4 is a side elevation of the connector assembly shown in FIG. 3.
Figure 5:
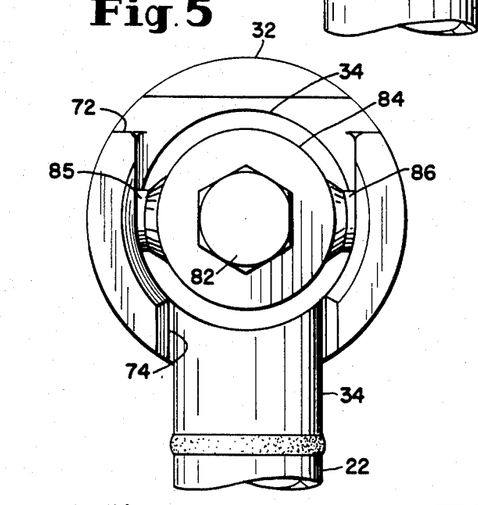
FIG. 5 is a right-hand end view of the connector assembly shown in FIGS. 3 and 4.
Figure 6:
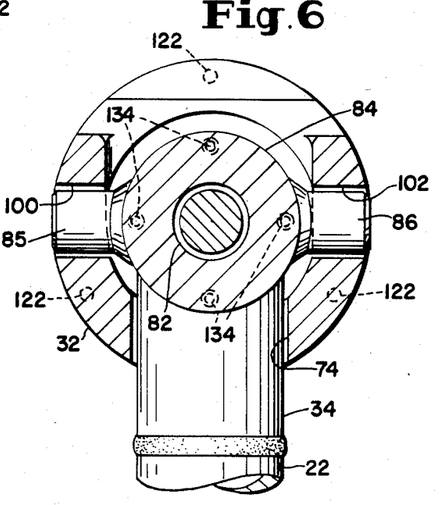
FIG. 6 is a transverse section taken substantially along lines 6—6 of FIG. 3.
Figure 10:
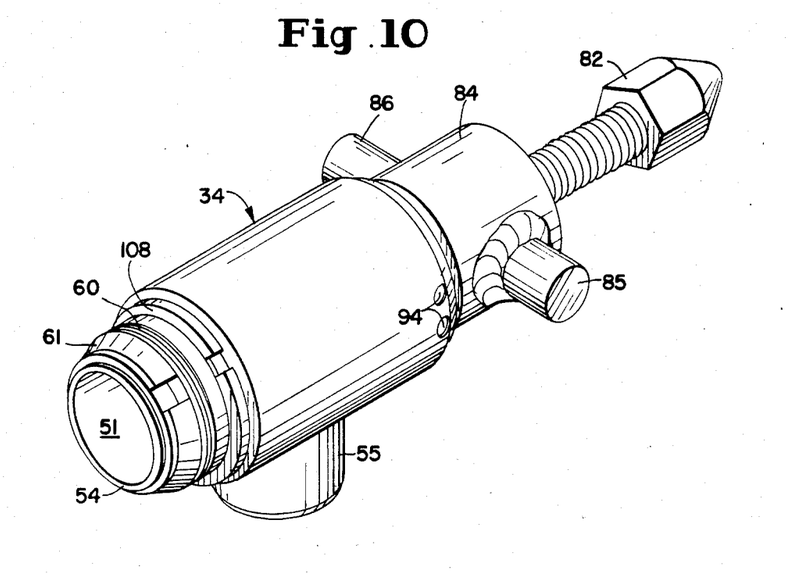
FIG. 10 is a perspective view of the male end connector which is mounted at one end of the jumper pipe.

Referring to FIGS. 3, 7 and 10, the locking mechanism 36 for male fitting 34 comprises a threaded adjustment stud 82, an internally threaded adjustment nut 84 threadedly mounted on stud 82 and a pair of cylindrical, axially aligned trunnions 85 and 86 fixed to and extending radially away from nut 84 on diametrically opposite sides thereof.

As shown in FIG. 7, adjustment stud 82 is formed with a cylindrically smooth end section 88 which is coaxially and rotatably received in a flat bottomed bore 90 in male fitting 34. Bore 90 is disposed rearwardly of and axially aligns with the male fitting's passage section 51.

A pair of dowel pins 94 are received in fitting 34 and seat in complementary notches or grooves in end section 88 and fitting 34. By this construction, adjustment stud 82 is rotatably mounted on male fitting 34, but is confined or locked against axial displacement relative to the male fitting. Stud 82 is rotatable about an axis which axially aligns with the axis of the male fitting's passage section 51.

Figures 11, 12:
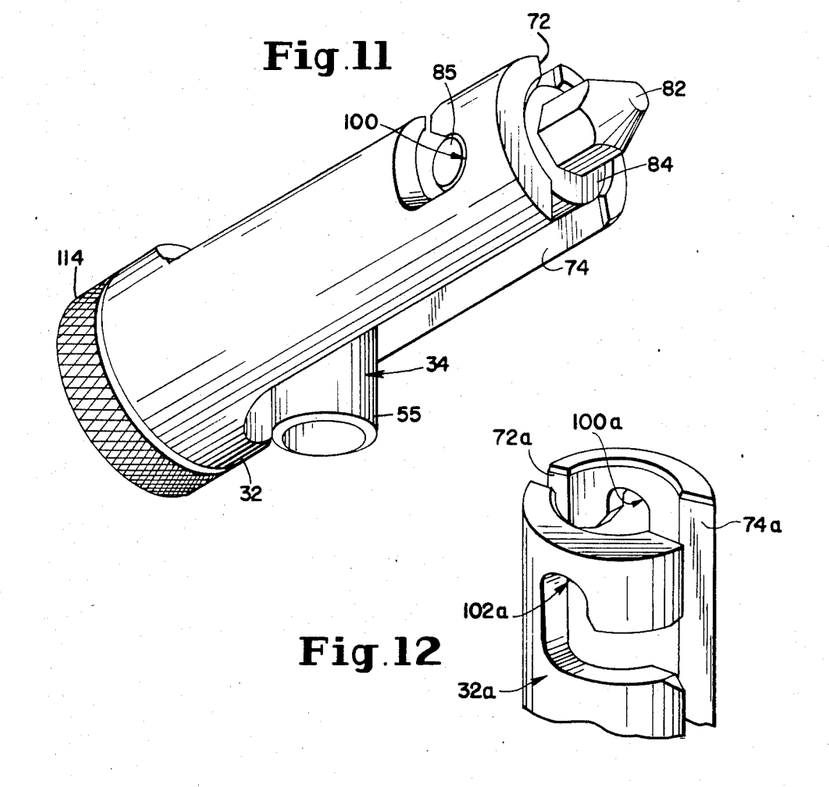
FIG. 11 is a perspective view of the assembly shown in FIG. 3.
FIG. 12 is a fragmentary perspective view of the pivot housing in the vertical connector assembly shown in FIG. 2.

As shown in FIGS. 3 and 11, the longitudinally slotted portion of pivot housing 32 is formed with a pair of bayonet type slots 100 and 102 for receiving trunnions 85 and 86, respectively. Slots 100, 102 open circumferentially toward each other at the opposing straight side edges of the pivot housing's longitudinal slot 72. Bayonet slots 100, 102 are thus accessed from slot 72.

Each of the bayonet slots 100, 102 is formed with a longitudinally extending side edge 104 which faces circumferentially towards the slot's open mouth. At its closed end, each of the slots 100, 102 is formed with a socket-defining arcuate edge 106. Edge 106 has a uniform radius of curvature.

After pivot housing 32 is mounted on female fitting 30, the sub-assembly of male end unit 26 and jumper pipe 22 is is assembled with pivot housing 32 by positioning the jumper assembly 37 vertically above pivot housing 32 at a location where the vertical leg of jumper pipe 22 vertically aligns with the housing's longitudinal slots 72, 74 and where the trunnions 85, 86 vertically align with the open mouths of bayonet slots 100, 102. At this state, nut 84 is positioned closely adjacent to the male fitting 34. The jumper assembly is then lowered vertically to a position where pipe 22 extends transversely through the longitudinal slots 72 and 74, male fitting 34 lies in housing 32 and trunnions 85, 86 are received in the mouths of bayonet slots 100, 102.

Jumper assembly 37 is then moved forwardly to a position where the free male end of fitting 34 is partially received in the female fitting's bell mouth 48. Adjustment stud 82 is thereafter rotated in a pre-selected direction while holding nut 84 against rotation with stud 82 to a position where trunnions 85, 86 seal against the edges 106 of slots 100, 102.

Further rotation of stud 82 threads stud 82 through nut 84 (which now remains stationary with housing 32), to axially shift fitting 34 more deeply into the female fitting's bell mouth 48 to its final position where seal ring 60 engages surface 66 and snugly seats in corner 70 (see FIG. 7A). The engagement of the diagonally opposite corner edges of seal ring 60 against corner 70 and surface 66 torsionally deflects seal ring 60 about its rectangular cross section to load or set the seal ring and to thereby establish the fluid tight seal. As a result, male fitting 34 will be clamped or confined against movement relative to the subassembly of housing 32 and female fitting 30 by the engagement of trunnions 85, 86 with the edges 106 of bayonet slots 100, 102 and by engagement of seal ring 60 with surface 66.

The complete male end unit 26 (comprising male fitting 34, adjustment stud 82 and nut 84) is essentially the same as the one shown in the prior connector of FIG. 1. Accordingly, like reference numerals have been applied to designate like parts of the two units except the reference numerals used for identifying the parts in the connector of FIG. 1 have been primed to distinguish them from those used for the male end unit 26.

Except for the unique configuration of the seal ring engaging surface 66 and the general configuration of the female fitting's bell shaped end portion 44 and the parts that it mounts, female fitting 30 is the same as the one used in the prior connector of FIG. 1. To the extent that the two female fittings are the same, like reference numerals have been applied to designate like portions, except that the reference numerals used for the prior female fitting in FIG. 1 have been primed to distinguish them from the reference numerals used to identify the portions of fitting 30 in the connector of this invention.

To the extent that housing 32 has been described, it also is the same as the fitting-receiving connector housing in the prior connector of FIG. 1. Accordingly, like reference numerals have been applied to designate like portions of the two housings, except that the reference numerals used for the housing in FIG. 1 have been primed to distinguish them from the reference numerals used for pivot housing 34 in this invention.

The prior connector of FIG. 1 will now be described in greater detail, followed by a description of the improvements in this invention.

In the connector of FIG. 1, the tubular, fitting-receiving connector housing is indicated at 300 and is rigidly fixed to the female end fitting (indicated at 302) by a set screw 304. In assembled relation with female fitting 302, housing 300 therefore is not movable relative to fitting 302. Housing 300 and female fitting 302 are coaxial.

Figure 1A:
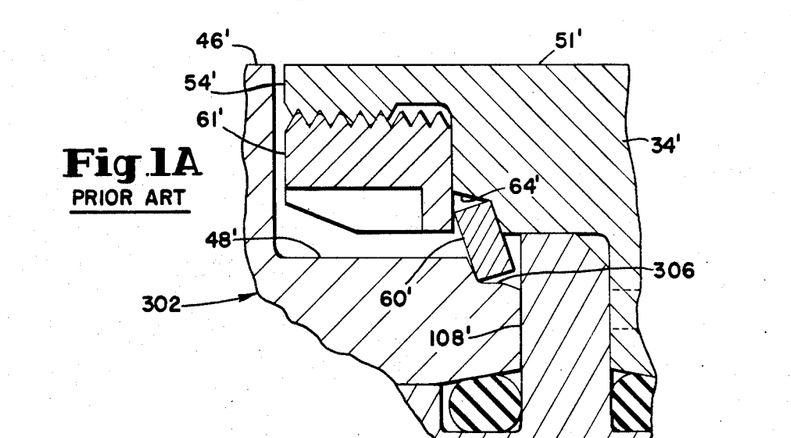
FIG. 1A is an enlarged fragmentary view of a sectioned portion of the prior art connector shown in FIG. 1.

In the prior connector of FIGS. 1 and 1A, seal ring 60' lies between the male fitting's conical surface 64' and a further conical surface 306 on the interior of the female fitting's enlarged male-receiving end portion. The diagonally opposite corner edges of seal ring 60' seat in circumferential corners at the ends of surfaces 64' and 306, respectively. Because of this prior art construction, the male end portion 54' must be axially aligned with the female fitting 302 in order to establish a reliable seal between the mating male and female end fittings. If the male end 54' and female fitting 302 are initially misaligned (angularly and/or laterally offset), jumper pipe 22', pipe section 14, or both, must be deformed to bring the mating male and female parts into alignment.

Another problem with the prior connector of FIG. 1 arises from the engagement of the adjustment stud's trunnions 85', 86' (only one shown in FIG. 1) with the inner arcuate edges 104' of the bayonet slots 100', 102' (only one shown in FIG. 1). As the trunnions 100', 102' ride along the longitudinally extending slot edges 104' and approach their fully seated positions on edges 106', the male fitting's end portion 54' will be angularly misaligned with housing 300 and female fitting 302. But as the trunnions 85', 86' ride onto the circumferential edges 106', they will exert a camming force on the male end fitting 34', thereby forcing it into axial alignment with housing 300. This camming action will result in the deformation of jumper pipe 22', pipe section 14, or both, because housing 300 is rigidly fixed to female fitting 302 and because male fitting 34' is rigidly fixed to jumper pipe 22'.

The improvements incorporated into the present invention overcome the pipe deformation problems due to the camming action mentioned above and also accommodate angular misalignment between the mating male and female end fittings without impairing the effectiveness of seal ring 60 to establish a fluid tight seal between the mating male and female fittings.

In accordance with this invention, pivot housing 32 is mounted on female fitting 30 for universal motion or articulation rather than being rigidly fixed to fitting 30 as is the case in the prior connector. To accomplish this, the end of housing 32 remote from the slotted end face 78 is formed with a pair of concentric, segmental spherical inner and outer ball joint surfaces 110 and 111 (see FIGS. 7 and 7A), each of which is contained in a spherical envelope. The female fitting's bell-shaped portion 44 is also formed with a segmental spherical ball joint surface 112 (see FIG. 7) which confronts and mates with the pivot housing's inner surface 110. Surfaces 110 and 112 have the same or substantially the same radius of curvature and seat against each other in assembled relationship.

Retainer nut 114 is threaded on an externally threaded section 116 of female fitting 30 behind pivot housing 32. Nut 114 is also formed with a segmental spherical ball joint surface 113. Surface 113 matingly seats against and has substantially the same radius of curvature as the outer spherically extending surface 111 on pivot housing 32. Surfaces 112 and 113 are each contained in a spherical envelope. Each of the surfaces 110-113 is in the form of endless band which completely encircles the axis of fitting 30.

Nut 114 confines the movement of pivot housing 32 to universal movement about a center point lying on the longitudinal axis of female fitting 30 and in a plane which normally intersects the longitudinal axis of female fitting 30 and which at least closely passes medially through seal ring 60 when the male end portion 54 axially aligns with female fitting 30. By locating the center of articulation at this position, seal ring 60 will not shift bodily as housing 32 is articulated about the center point.

From the foregoing description, it will be appreciated that nut 114 and female fitting 30 define a partial socket which receives the pivot or knuckle end of housing 32.

The assembly of nut 114 and female fitting 30 holds housing 32 captive, but allows housing 32 to articulate universally for enabling housing 32 to be angularly displaced into axial alignment with the male end portion 54.

Figure 9:
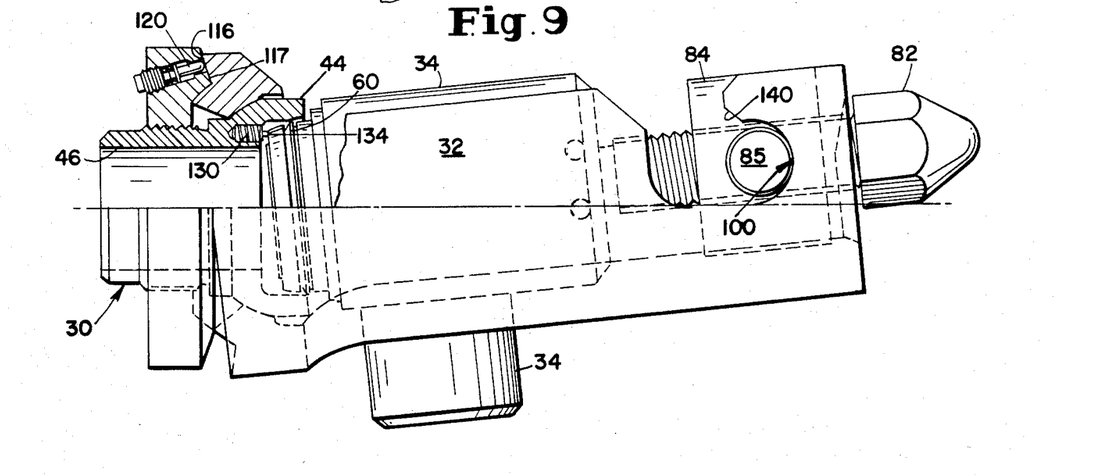
FIG. 9 is a partially sectioned side elevation similar to FIG. 8, but showing the parts of the connector in their final assembled positions where the pivot housing has been articulated into alignment with the male housing which remains angularly misaligned with the female fitting.

Any suitable means (not shown) may be utilized for releasably locking nut 114 in its final position shown in FIG. 7. Likewise, any suitable means may be utilized for limiting the angle through which housing 32 can be universally articulated relative to the axis of female fitting 30. For example, the angle of articulation may be limited by abutment of annularly extending shoulders 116, 117 on nut 114 and pivot housing 32, respectively, as shown in FIG. 9.

Still referring to FIG. 7, nut 114 mounts three spaced apart plunger assemblies 120 (one shown in FIG. 7) having plungers 122 which engage the shoulder 116 of pivot housing 32. Plungers 122 yieldably hold pivot housing 32 in near alignment with female fitting 30 prior to insertion of male fitting 34 into housing 32 and also during the initial insertion of male fitting 34. Plunger assemblies 120 are equiangularly spaced apart in a plane normally intersecting the axis of female fitting 30.

In addition to the plunger, each of the plunger assemblies 120 comprises a biasing spring 124 and adjustment nut 126 for pre-loading spring 124. Each plunger assembly 120 is coaxially mounted in a separate bore 128 which is formed through nut 114 along an axis normally intersecting shoulder 117 as seen in a plane containing the plunger axis and the longitudinal axis of fitting 30. Each plunger 122 is slidable in its associated bore 128.

The spring 124 in each plunger assembly 120 is compressed between nut 126 and plunger 122 to yieldably bias the plunger into engagement with the pivot housing's shoulder 116. Coacting shoulders in bore 128 and on plunger 122 prevent the plunger from being pushed out of bore 128. The nuts 126 of assemblies 120 are adjusted to pre-load the plunger springs 124 so that there is sufficient bias to prevent pivot housing 32 from drooping under the influence of its own weight. Plunger assemblies 120 may be mounted on pivot housing 32 instead of nut 114.

Still referring to FIGS. 7 and 7A, a set of four spring-biased plunger assemblies 130 (two shown in FIG. 7) are mounted in the bell-shaped portion 44 of female fitting 30. Plunger assemblies 130 are equiangularly spaced apart in a plane normally intersecting the female fitting's longitudinal axis and are each coaxially received in a blind bore 132. Bores 132 are paralled with the longitudinal axis of fitting 30 and open at an internal, annular, radially extending shoulder 133 which extends between passage 46 and bell mouth 48.

Each plunger assembly 130 comprises a plunger 134, which is slidably mounted in its associated bore 132, and a spring 136 which is compressed between its plunger and the bottom wall of bore 132 to bias the plunger axially outwardly to engage the flat annular end face of the seal ring retainer 61. Plungers 134 lie along a common circle which is coaxial with the longitudinal axis of fitting 30. Likewise, plungers 122 lie along a common circle which is coaxial with the axis of fitting 30.

During the installation of male fitting 34 in housing 32, plunger 134 exerts a stronger spring-biased force on male end fitting 34 than the spring-biased force which plungers 122 exert on housing 32. The bias of plungers 134 is strong enough to keep seal ring 60 from engaging and deflecting against the female fitting's surface 66 before housing 32 is brought into alignment with the male end portion 54. This action keeps seal ring 60 from scuffing surface 66 as will be described in greater detail later on.

Unlike the prior connector of FIG. 1, the internal, seal engaging surface 66 is a segmental spherical surface which peripherally surrounds seal ring 60 in the final assembly of parts and which is in the form of an endless band. Surface 66 is contained in a spherical envelope. Surfaces 66, 11, 113, 110 and 112 have a common center.

Because of its segmental spherical configuration, surface 66 enables seal ring 60 to establish a reliable seal even where the longitudinal axis of male end portion 54 is angularly misaligned with the longitudinal axis of female fitting 30 in the final assembly of parts. This construction therefore eliminates the seal problem which occurs in the prior connector of FIG. 1 when the prior connector's male and female end fittings are angularly misaligned.

Figure 8:
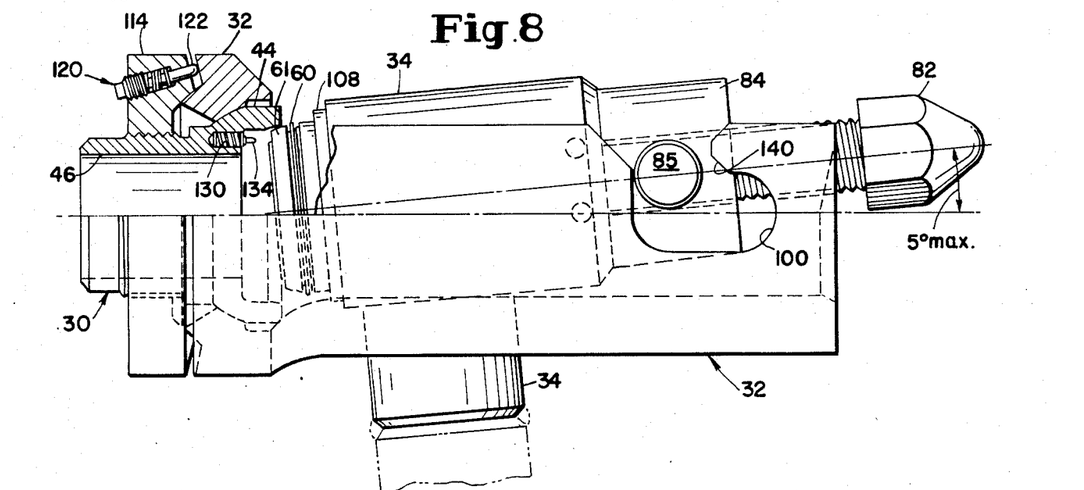
FIG. 8 is a partially sectioned side elevation similar to FIG. 7 but illustrating an intermediate stage of the installation of the male end fitting with the sub-assembly of the female fitting and the pivot housing where the male end fitting is angularly misaligned with respect to the pivot housing and the female fitting.

FIG. 8 shows the initial insertion of male fitting 34 into housing 32 in an installation where, for some reason, male fitting portion 54 is angularly misaligned with female fitting 30 and also pivot housing 32. At this stage of the installation, housing 32 is held in axial alignment with female fitting 30 by plungers 122, trunnions 85, 86 lie in the mouths of bayonet slots 100, 102, and the nose of the male end portion 54 is partially received in the female fitting's bell mouth 48 at a position where seal ring 60 still lies exteriorly of female fitting 30.

As the insertion of male fitting 54 into female fitting 30 continues, the seal retainer 61 on the male fitting 34 will engage one or more but not all of the plungers 134 before seal ring 60 enters the female fitting's bell mouth 48 and contacts surface 66. As this point of the installation, trunnions 85, 86 confront and lie just forwardly of arcuate camming edge surfaces 140 (see FIGS. 3 and 7A) on bayonet slots 100 and 102. Camming surface 140 joins with the upper end of the bayonet slot's arcuate edge 104 at the closed interior end of the bayonet slot's open, trunnion-receiving mouth.

With the nose end of the male end portion 54 engaging one or more of the plungers 134 and with seal ring 60 still lying out of contact with surface 66, adjustment stud 82 is rotated in a pre-selected direction while holding adjustment nut 84 against rotation with the adjustment stud, thus causing nut 84 to travel axially along stud 82 so that trunnions 85, 86 engage and cam along the camming surfaces 140.

As trunnions 85, 86 travel over the camming edge surfaces 140, and into the socket ends of slots 100, 102, a camming force will be imparted to pivot housing 32, causing it to articulate about its center of articulation against the spring-biased force of plungers 122 and to a position where it axially aligns with male end portion 54. Having a weaker spring-biasing force than plungers 134, one or more of the plungers 122 will be overpowered by the foregoing camming action and will therefore be depressed to enable pivot housing 32 to be articulated into angular alignment with the male end portion 54 as shown in FIG. 9.

Plungers 134 thus provide a resistance or reaction surface for enabling housing 32 to be pivoted by the camming engagement of trunions 85, 86 with the edge surfaces of slots 100, 102.

Without plungers 134, the engagement of trunions 85, 86 would objectionably urge the male end portion 54 forwardly to its initial seating position where seal ring 60 engages the female fitting's internal surface 66 to create the resistance that would cause housing 32 to articulate into angular alignment with male end portion 54. This action, however, would cause seal ring 60 to objectionably scrap along surface 66 which could damage the sealing interface to create a leak and/or to cause seal ring 60 to dig into surface 66 and to lock up with female fitting 30 and thereby prevent angular alignment of housing 32 with male end portion 54.

But in the present invention, plungers 122 will continue to yield before plungers 134 yield, until the pivot housing's shoulder 117 seats against the retaining nut's shoulder 116. By this time, housing 32 will be angularly aligned with male end portion 54 where the initial misalignment was within the design adjustment range of the connector. For the illustrated embodiment, the maximum, initial angular misalignment is about 5 degrees.

When trunnions 85, 86 seat in the socket ends of slots 100, 102, in engagement with edge surfaces 106 (which define the socket ends) housing 32 will be axially aligned with the male end portion 54. Further angular displacement of housing 32 will be prevented by engagement of trunnions 85, 86 with edge surfaces 106 of slots 100, 102. As the rotation of stud 82 is continued, the stud will then be threaded through nut 84, displacing male end fitting 34 relative to housing 32 to its final position where it depresses the engaged one or ones of plungers 134. In this final position (see FIG. 9) male end portion 54 will be fully seated in the female fitting's bell portion 44 and seal ring 60 will engage surface 66. Engagement of seal ring 60 with surface 66 will result in the torsional deflection of the seal ring to its seal-establishing, set condition (see FIG. 9). Male end unit 26 will now be fully detachably coupled to female end unit 28. The torsional deflection of seal ring 60 compressively, radially loads the diagonally opposite corner edges of ring 60 to establish fluid tight seals along the corner edges in a manner described in detail in U.S. Pat. No. 3,625,552.

Because surface 66 establishes a reliable seal even where the female fitting 30 and the male end portion 54 are angularly misaligned in the final position of parts shown in FIG. 9, the jumper pipe 22 and/or pipe section 14 do not have to be deformed to angularly align the mating male and female fittings. The alignment of housing 32 with male end portion 54 also eliminates the need for deforming jumper pipes 22 and/or pipe 14 for bringing about such angular alignment.

The construction of the vertically extending male and female connector assembly 23 is the same as that just described for the horizontal connector assembly except that the pivot housing's bayonet slots 100a, 102a (see FIG. 12) open circumferentially in a common direction, with the former opening into the pivot housing's longitudinal slot 72a, and the latter opening into the pivot housing's longitudinal slot 74a. By this construction, the male end fitting 34a is vertically inserted, endwise, into the slotted, upper end of pivot housing 32a (as shown in FIG. 2A) to position trunnions 85a, 86a at the open mouths of the bayonet slots 100a, 102a. The male end fitting 34a is then turned or rotated clockwise to seat trunnions in slots 100a, 102a.

Sufficient clearance is provided between the parts of the male and female end units 26a, 28a to allow the jumper pipe assembly 37 (consisting of jumper pipe 22, and male end units 26, 26a) to be horizontally shifted and/or tilted slightly for enabling the male end portion 54 to clear the end of female fitting 30 as it lowered into housing 32.

To detach and remove jumper assembly 37 (i.e., the assembly of jumper pipe 22 and male end units 26, 26a), adjustment studs 82, 82a are rotated in directions to loosen their adjustment nuts 84, 84a. The male end units 26, 26a are then removed from pivot housings 32, 32a in the reverse manner in which they were installed to uncouple jumper assembly 37 from female units 28, 28a.

Seal ring 60 sometimes becomes defective to result in leakage and therefore requires replacement. Occasionally, however, seal ring 60 will be stuck on male end portion 54, making it difficult to remove. To overcome this problem, the male end unit 26 is equipped with a seal ring extractor ring 108 (FIG. 7A). Ring 108 is threaded on and coaxially surrounds a threaded section of the male end portion 54 between seal ring 60 and the male end body portion 55.

In order to remove seal ring 60, the previously mentioned jumper assembly (22, 26 and 26a) is first uncoupled from female end units 28, 28a in the manner previously described, and the uncoupled jumper assembly is removed to a suitable work area. If the seal ring 60 does not come off easily after removing the seal retainer ring 61, then extractor ring 108 is unthreaded in the direction of the seal ring 60 to butt its annular nose against the seal ring and thus exert a positive mechanical force for dislodging the seal ring and forcing it off the male end fitting.

Being of the same construction as male end unit 26, it will be appreciated that male end unit 26a is also equipped with a seal ring extractor which is the same as that just described for male end unit 26. The prior art construction of FIGS. 1 and 1A is also provided with a seal ring extractor which is indicated at 108'.

The adjustment studs 82 and 82a, nuts 84 and 84a and the other parts requiring manipulation to attach jumper assembly 37 to female units 28, 28a and also to detach the jumper assembly from the female units are so configured that they can be gripped or engaged by remotely-operated tools. The jumper assembly 37 may therefore be attached and detached remotely.

What is claimed and desired to be secured by Letters Patent is:

1. In a fluid-conveying connector, an assembly for coupling together a pair of fluid-conveying pipes and comprising a female end member adapted to be fixed to one of said pipes, a male end member adapted to be fixed to the other of said pipes and having an end portion adapted to be received in said female member, a seal ring positioned between and engaging said female member and said end portion of said male member for establishing at least a substantially fluid tight seal between said male and female members, a housing structure receiving said male and female members, means mounting said housing structure on said female member for universal articulation relative to said female member for enabling said housing structure to be angularly aligned with said end portion of said male member, and selectively operable means carried by said male member and engageable with said housing structure for confining said male member between surfaces on said housing structure and said female member with said end portion disposed in said female member and for articulating said housing structure into angular alignment with said end portion whenever said housing structure is initially angularly misaligned with said end portion during installation of said male member with said female member.

2. The fluid-conveying connector defined in claim 1 including means yieldably biasing said housing structure to a position where it is at least closely axially aligned with said female member.

3. The fluid-conveying connector defined in claim 1 including a retainer structure mounted on said female member and engaging said housing structure for confining the movement of said housing structure to universal articulation relative to said female member.

4. The fluid-conveying connector defined in claim 3 comprising means carried by one of said structures and engaging the other of said structures for yieldably biasing said housing structure to a position where it at least closely axially aligns with said female member.

5. The fluid-conveying connector defined in claim 4 wherein said retainer structure comprises a further member, said housing structure having an end portion confined between said further member and said female member, said end portion of said housing structure being formed with opposite facing first and second segmental spherical surfaces extending circumferentially around said female member, said further member being formed with a third segmental spherical surface, and said female member being exteriorly formed with a fourth segmental spherical surface facing said third segmental spherical surface, and said third and fourth segmental spherical surfaces being seated against said first and second segmental spherical surfaces, respectively, to provide for the universal articulation of said housing structure relative to said female member.

6. The fluid-conveying connector defined in claim 5 wherein said means yieldably biasing said housing structure comprises a plurality of circumferentially spaced apart spring-biased plunger elements mounted on said further member and bearing against said housing structure.

7. The fluid-conveying connector defined in any one of the preceding claims 1-6, including further means carried by said female member for yieldably biasing said male member in a direction opposite to the direction in which said male member is inserted into said female member, said selectively operable means being mounted on said male member and comprising a unit which is selectively displaceable relative to said male member to a position where it engages and reacts against said housing structure to urge said male member into said female member against the bias of said further means, the bias exerted by said further means being sufficiently strong to prevent said male member from entering said female member sufficiently far to engage said seal ring with said female member before said housing structure is articulated into alignment with said end portion of said male member.

8. The fluid-conveying connector defined in any one of the preceding claims 1-6 wherein said housing structure is open at one end to receive said female member, and wherein said housing structure has a further opening through which said male member is inserted for reception in said female member.

9. The fluid-conveying connector defined in any one of the preceding claims 1-6 wherein said female member is formed with an interior circumferentially extending seal ring-engaging surface, and wherein said end portion of said male member is formed with an exterior circumferentially extending seal ring-engaging surface, said interior and exterior surfaces overlapping each other and being radially spaced apart to delimit a circumferentially extending cavity receiving said seal ring, said seal ring being formed with diagonally opposite corner edges which respectively engage said interior and exterior surfaces, and said seal ring being torsionally deflectable by the engagement of its diagonally opposite corner edges with said interior and exterior surfaces to establish at least a substantially fluid tight seal between said male and female members, and said interior surface being contained in a spherical envelope.

10. The fluid-conveying connector defined in any one of the preceding claims 1-6 wherein said housing structure is universally articulatable about a center point lying on the longitudinal axis of said female member.

11. The fluid-conveying connector defined in any one of the preceding claims 1-6 wherein said housing structure is universally articulatable about a center point lying on the longitudinal axis of said female member and contained in plane normally intersecting said longitudinal axis and passing through said seal ring when said end portion of said male member is axially aligned with said female member.

12. The fluid-conveying connector defined in any one of the preceding claims 1-6 wherein said selectively operable means is mounted on said male member and includes at least one part which is selectively displaceable to a position where it engages said housing structure to confine the assembly of said male member and said seal ring against movement relative to said housing structure and said female member.

13. The fluid-conveying connector defined in claim 1 wherein said female member is formed with a circumferentially extending interior surface which is contained in a spherical envelope, said end portion of said male member being formed with exterior circumferentially extending surfaces which intersect to define a circumferentially extending corner, said seal ring having diagonally opposite corner edges which engage said interior surface and said corner to establish a fluid tight seal between said male and female members.

14. In a fluid-conveying connector, an assembly for coupling together a pair of fluid-conveying pipes and comprising a female end member adapted to be fixed to one of said pipes, a male end member adapted to be fixed to the other of said pipes and having an end portion received in said female member, said end portion and said female member defining therebetween a circumferentially extending cavity, said end portion being formed with an exterior circumferentially extending corner and said female member being formed with an interior circumferentially extending surface delimiting said cavity, a seal ring carried by said end portion and received in said cavity, said seal ring having diagonally opposite corner edges, and means for displacing said male member relative to said female member to engage said diagonally opposite corner edges with said corner and said interior surface to thereby torsionally deflect said seal ring for establishing a fluid tight seal between said male and female members, said interior surface being contained in a spherical envelope, a housing structure adapted to carry said male end member, and means mounting said housing structure on said female member for articulation about a center point lying on the longitudinal axis of said female member and contained in a plane normal to said longitudinal axis and passing through said seal ring when said end portion of said male member is axially aligned with said female member.

* * * * *